US012644689B2

(12) United States Patent
Abou-Chahine et al.

(10) Patent No.: US 12,644,689 B2
(45) Date of Patent: Jun. 2, 2026

(54) POSITION SENSING FOR A ROTATIONAL ANGLE SENSOR

(71) Applicant: HELLA GmbH & Co. KGaA, Lippstadt (DE)

(72) Inventors: Zeid Abou-Chahine, Lippstadt (DE); Henning Irle, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 290 days.

(21) Appl. No.: 18/370,259

(22) Filed: Sep. 19, 2023

(65) Prior Publication Data

US 2024/0003668 A1       Jan. 4, 2024

Related U.S. Application Data

(63) Continuation of application No. PCT/EP2022/055261, filed on Mar. 2, 2022.

(30) Foreign Application Priority Data

Mar. 19, 2021     (DE) ...................... 10 2021 106 879.7

(51) Int. Cl.
    *G01B 7/00*          (2006.01)
    *G01B 7/30*          (2006.01)
    (Continued)

(52) U.S. Cl.
    CPC ............... *G01B 7/003* (2013.01); *G01B 7/30* (2013.01); *G01D 5/2405* (2013.01); *G01D 5/2415* (2013.01)

(58) Field of Classification Search
    CPC ........ G01B 7/003; G01B 7/30; G01D 5/2405; G01D 5/2415
    See application file for complete search history.

(56) References Cited

U.S. PATENT DOCUMENTS

| | | | |
|---|---|---|---|
| 4,851,835 A | | 7/1989 | Krumholz et al. |
| 5,869,962 A | * | 2/1999 | Kasumi ................... G01P 3/488 |
| | | | 324/207.2 |

(Continued)

FOREIGN PATENT DOCUMENTS

| | | |
|---|---|---|
| DE | 102004019379 A1 | 11/2005 |
| DE | 102008057416 A1 | 5/2010 |

(Continued)

OTHER PUBLICATIONS

EP-3252433-A1, English Translation (Year: 2017).*

(Continued)

*Primary Examiner* — Ryan D Walsh
(74) *Attorney, Agent, or Firm* — Muncy, Geissler, Olds & Lowe, P.C.

(57)            ABSTRACT

A position-sensing device for a rotation angle sensor, to a rotation angle sensor having a position-sensing device of this type, and to a system having a rotation angle sensor of this kind. The position-sensing device has at least one stator, at least one rotor, and an evaluation unit. The at least one rotor has a main body and at least one rotor blade extending radially outward from the main body. There is a first dielectric having a first permittivity between at least one first of the at least one rotor blade and the at least one stator. There is a second dielectric having a second permittivity between at least one second of the at least one rotor blade, or at least one free space, adjoining the at least one first rotor blade in the circumferential direction of the rotor, and the at least one stator. The first permittivity and the second permittivity are different from each other.

14 Claims, 5 Drawing Sheets

(51) Int. Cl.
    *G01D 5/24*           (2006.01)
    *G01D 5/241*         (2006.01)

(56)           References Cited

U.S. PATENT DOCUMENTS

| | | | | |
|---|---|---|---|---|
| 6,118,283 | A * | 9/2000 | Cripe | G01B 7/30 |
| | | | | 324/660 |
| 6,236,199 | B1 * | 5/2001 | Irle | G01D 5/2093 |
| | | | | 324/207.17 |
| 6,404,188 | B1 * | 6/2002 | Ricks | G01D 5/2457 |
| | | | | 324/207.25 |
| 7,028,545 | B2 | 4/2006 | Gandel et al. | |
| 7,644,635 | B2 | 1/2010 | Prudham et al. | |
| 11,371,826 | B2 | 6/2022 | Irle et al. | |
| 2010/0033064 | A1 | 2/2010 | Tanaka et al. | |
| 2024/0003713 | A1 * | 1/2024 | Irle | G01L 5/221 |

FOREIGN PATENT DOCUMENTS

| | | | |
|---|---|---|---|
| DE | 102018204901 A1 | 10/2019 | |
| EP | 0258725 A2 | 2/1988 | |
| EP | 1269133 B1 | 5/2004 | |
| EP | 2383558 A1 | 11/2011 | |
| EP | 2800252 A2 | 11/2014 | |
| EP | 3252433 A1 * | 12/2017 | H03K 17/975 |
| JP | H0875406 A | 3/1996 | |
| RU | 202950 U1 * | 3/2021 | G01B 7/30 |
| WO | WO-9843046 A2 * | 10/1998 | G01D 5/2412 |
| WO | WO-02084222 A1 * | 10/2002 | G01D 5/2415 |
| WO | WO2019185336 A1 | 10/2019 | |

OTHER PUBLICATIONS

RU-202950-U1, English Translation (Year: 2021).*
WO-02084222-A1, English Translation (Year: 2002).*
WO-9843046-A2, English Translation (Year: 1998).*
International Search Report dated Jun. 14, 2022 in corresponding appication PCT/EP2022/055261.
Zangl, Hubert et al: "Simulation and Robustness Analysis for a Novel Capacitive/Magnetic Full-Turn Absolute Angular Position Sensor" IEEE Transactions on Instrumentations and Measurement, vol. 54. No. 1, Feb. 2005.

* cited by examiner

POSITION SENSING FOR A ROTATIONAL ANGLE SENSOR

This nonprovisional application is a continuation of International Application No. PCT/EP2022/055261, which was filed on Mar. 2, 2022, and which claims priority to German Patent Application No. 10 2021 106 879.7, which was filed in Germany on Mar. 19, 2021, and which are both herein incorporated by reference.

BACKGROUND OF THE INVENTION

Field of the Invention

The present invention relates to a position-sensing device for a rotation angle sensor, to a rotation angle sensor having a position-sensing device of this type, and to a system having such a rotation angle sensor.

Description of the Background Art

Rotation angle sensors are used, e.g., in motor vehicles. For example, electromotive servo devices are increasingly being used in motor vehicles for steering assistance. These require the steering torque for control. The steering torques can be detected in a steering column by a torsion bar in differential angles and calculated from these. More precisely, rotations at the ends of the torsion bar are determined by means of rotation angle sensors and the differential angles are derived from them. The differential angles caused by the torsion are to be determined independently of a position of the steering wheel. In today's electric power steering systems, torque sensors are used as the human-machine interface, also known as HMI. This is used to measure the "force" that the driver applies to the steering wheel so that steering assistance can be provided. In the future as well, with the elimination of the steering column and the establishment of so-called steer-by-wire systems, sensors for the steering angle and optionally the steering torque will be necessary on the steering drive unit or the "hand wheel sensor and actuator."

Further, it is important, e.g., for driver assistance systems such as ESP (electronic stability program for vehicle handling) to know the position (relative angular position) of the steering wheel. For this purpose, a twist of the steering wheel (angle relative to a reference position) is determined. So that angles larger or smaller than 360° can also be determined, an indexing is assigned to the reference position.

In the case of magnetic torque sensors, for example, it is known to generate a signal for each complete revolution of the steering wheel for indexing by means of a Hall sensor and an associated magnet, and thus to determine a number of revolutions. A method often referred to as magnetic shuttering is used here, in which a change in magnetic flux density occurs during rotation. Associated sensors are also referred to as torque only sensors (TOS). These sensors are not able to detect a steering angle. Examples of such torque sensors are described in EP 1 269 133 B1 (which corresponds to US 2004/0011138) and U.S. Pat. No. 7,644,635 B2.

Such devices for determining an angle of rotation and/or a torque of a rotating part as well as methods for their operation are already known from the prior art in numerous design variants. In general, sensors are known that measure both the torque on the steering wheel and the steering angle.

A method for determining a differential angle is known from DE 10 2004 019 379 A1, in which two angles of rotation are determined and a differential angle is calculated from them. When calculating the differential angle, different transmission ratios between the rotations of two components are taken into account. A large number of revolutions are not taken into account.

An inductive angle sensor for determining the torque and relative angular position with respect to a reference position is known from EP 2 383 558 A1, which sensor comprises a detector for detecting angles and differential angles as well as an indexer for indexing when passing through the reference position with a permanent magnet and a Hall sensor. To create a torque sensor that can be manufactured inexpensively and compactly with angle determination and indexing, a flux guide plate is assigned to the Hall sensor, which in the reference position conducts the flux of the permanent magnet to the Hall sensor.

A device for determining an angle of rotation and/or a torque of a rotating part is known from WO2019/185338 A1, which corresponds to US 2021/0010793 and US 2021/0010881 and which are incorporated herein by reference. The device comprises at least one angle detector for detecting an angular position of the rotating part relative to a reference position and at least one indexer for indexing at a predetermined rotation, preferably a 360° rotation, of the rotating part relative to the reference position. The angle detector has a rotor connected nonrotatably to the rotating part with a base body for attachment to the rotating part and a plurality of blades extending radially outward from the base body. At least one of the rotor blades has a marker detectable by the indexer.

It is possible with the aid of such indexing to dispense with an absolute determination of the steering angle over the measuring range of typically 1440°. Rather, a kind of contactless switch is added by means of indexing, which generates a switching signal (index signal) in the case of driving straight ahead. Previous versions of the index switch are magnetic and require an additional magnet and an additional integrated circuit. They are not very robust with regard to being influenced by external fields.

SUMMARY OF THE INVENTION

It is therefore an object of the present invention to provide a position-sensing device for a rotation angle sensor, a rotation angle sensor having such a position-sensing device, and a system having such a rotation angle sensor.

According to an example, there is provided a position-sensing device for a rotation angle sensor. The position-sensing device has at least one stator, at least one rotor, and at least one evaluation unit. The at least one rotor has a main body and at least one rotor blade extending radially outward from the main body. There is a first dielectric having a first relative permittivity (herein referred to as first permittivity for short) between at least one first of the at least one rotor blade and the at least one stator. There is a second dielectric having a second relative permittivity (herein referred to as second permittivity for short) between at least one second of the at least one rotor blade or at least one free space, adjoining the at least one first rotor blade in the circumferential direction of the rotor, and the at least one stator. In other words, the second dielectric is present between the at least one second of the at least one rotor blade and the at least one stator or between the at least one free space, adjoining the at least one first rotor blade in the circumferential direction of the rotor, and the at least one stator. The first permittivity and the second permittivity are different from each other. The evaluation unit is designed to sense if the at least one first rotor blade, for example, based on a reference position, reaches, has reached, or exceeds a predefined rotational position.

The at least one stator can be arranged stationary relative to a rotating element. The at least one rotor can be connectable nonrotatably to the rotating element.

The evaluation unit can be designed to sense, based on a capacitive coupling between the at least one rotor and the at least one stator, when the at least one first rotor blade reaches, has reached, or exceeds a predetermined rotational position, based on a reference position. According to one embodiment, the evaluation unit is designed not to determine the exact angle of rotation of the at least one rotor blade based on the capacitive coupling, but to sense when the at least one first rotor blade reaches, has reached, or exceeds the predefined rotational position, based on a reference position. For example, the predefined rotational position can be a single fixed position relative to the circumference of the stator and/or rotor. For example, the predefined rotational position can correspond to the reference position. According to this example, after each complete rotation of the at least one first rotor blade, the predefined rotational position can be reached again. According to another example, the predefined rotational position can correspond to a rotation angle segment. The rotation angle segment can be smaller than 360°.

Therefore, it can be said that the position-sensing device operates capacitively according to the first aspect. In this regard, the at least one rotor functions as at least one electrode and the at least one stator functions as an associated electrode. The at least one rotor and the at least one stator can be at a different potential. An electric field can form as a result between the at least one rotor and the at least one stator. The strength of the electric field depends on various parameters. Among other things, the strength of the electric field between the at least one rotor and the at least one stator depends on the material located between the at least one rotor and the at least one stator. The material in this case serves as a dielectric. The higher the permittivity of the material serving as the dielectric, the lower the electric field strength of the forming electric field. The lower the permittivity of the material serving as dielectric, the higher the electric field strength of the forming electric field.

The capacitive design of the position-sensing device is advantageous. Due to the increasing requirements in the context of electromobility, the requirements for limit values for EMC (electromagnetic compatibility) for low-frequency magnetic fields are also increasing. Such very large magnetic fields arise especially with the high currents of the electrical machines of a traction drive of an electric vehicle. Inductive solutions are susceptible to EMC. The capacitive solution proposed herein provides an improvement in robustness against magnetic fields as well as a simpler and thus more cost-effective solution.

Based on the different permittivity of the first dielectric and the second dielectric, the at least one first rotor blade can be distinguished from the at least one second rotor blade and/or the at least one free space. According to one possible exemplary embodiment, it is conceivable that, for example, there is only a single first rotor blade. This single first rotor blade can be distinguished from the other rotor blades of the at least one rotor or from the at least one free space. For example, it can be determined by the evaluation unit when the single first rotor blade, starting from the reference position, reaches, has reached, or exceeds a predefined rotational position. The predefined rotational position can be identical for each rotation. According to one example, there can be a single predefined rotational position per complete revolution. It can be determined by the evaluation unit, for example, when the single first rotor blade has rotated by a predefined angle of rotation in each case, e.g., by a full rotation of 360°, up to the predefined rotational position. In this way, for example, one full revolution of the single first rotor blade (i.e., one revolution of 360°) can be determined in each case. According to a further example, there may be multiple predefined rotational positions per complete revolution. It can be determined by the evaluation unit, for example, when the single first rotor blade has rotated by a predefined angle of rotation in each case, e.g., by a rotation angle segment of 40°, for example, up to the predefined rotational position. In this way, for example, one revolution of the single first rotor blade by a certain rotation angle segment (e.g., one revolution by 40°) can be determined in each case.

The evaluation unit can be designed to generate a switching signal if the at least one first rotor blade reaches, has reached, or exceeds the predefined rotational position. The evaluation unit can be designed to generate a switching signal when it determines that the at least one first rotor blade reaches, has reached, or exceeds the predefined rotational position. The switching signal can be a logical switching signal, which can be transmitted via an electronic digital interface together with further sensor or diagnostic data. For example, each time a switching signal is generated, a counter can be increased or decreased by 1, e.g., depending on the direction. A type of indexing can be achieved in this way. With the aid of such indexing, it is possible to dispense with absolute determination of the steering angle over the measuring range of typically 1440° by means of angle sensors and gear reductions. Rather, by means of indexing, a kind of contactless switch or counter is added which, for example, generates a switching signal (index signal) in the case of driving straight ahead and/or when the predefined rotational position is reached. The position-sensing device can therefore also be regarded as a type of switch and referred to as a switch, for example. If an angle sensor on the steering unambiguously detects a steering angle subrange, the direction-dependent switching signal can be used to count the steering angle subranges and thus, to achieve an unambiguous derivation to an overall measurement range from the counter reading multiplied by the steering angle subrange, added to the angle within the steering angle subrange. Here, for a selectable design, for example, a partial range is specified by the number of blades of the rotor of, for example, 9, resulting in the steering angle subrange to be uniquely measured as 360°/9=40°.

Previous designs of such an index switch are magnetic, require an additional magnet, and an additional integrated circuit. The capacitive solution presented herein is more robust with respect to the influence by external fields.

For example, the counter can be increased or decreased by 1 each time the at least one first rotor blade reaches, has reached, and exceeds directionally weighted a predefined rotation angle segment as the predefined rotational position. In this way, reaching or exceeding certain rotation angle segments, e.g., of 40°, can be counted. The angle of rotation can then be derived accordingly from the counter reading without having to determine the angle of rotation itself. If, for example, the angle subrange is 40°, i.e., the counter is increased or decreased each time a rotation angle segment of 40° is reached, a rotation angle of 4*40°=160° can be derived with a counter reading of 4 for the specified direction.

According to one example, an index switch can be realized with the help of the evaluation unit; the evaluation unit can be arranged in such an index switch or the rotation angle sensor can be realized as such an index switch. The index switch can be mounted, for example, when the steering is straight. It can be assumed that normally right and left turns should alternate on roads. If the straight-ahead travel has been found and checked for plausibility as an index point, in particular the overshoots of the motor position sensor for commutation of this motor or the sweeping of the specific angle segments, for example, 40° segments, of a rotation angle sensor can be counted.

In torque sensors known from the conventional art with a magnetic shutter, as described above, no steering angle is sensed in the case of the magnetic shutter. Counting of angle segments/angle subsections after indexing is not possible according to this. Therefore, an index switch and counter actually seem unnecessary. However, an index switch and an associated counter are also advantageous in this context, because another position sensor is implemented on this motor to control the electric motor of the power steering and to commutate it. Due to the gear ratio of the steering gear of approximately 20 . . . 30, the sensor signal repeats quite frequently, but can be counted after indexing. In this way, an angle sensor value for the steering angle can be inferred (indirectly, so to speak).

The at least one rotor can have a metal. For example, the main body and/or the at least one rotor blade of the at least one rotor can have a metal. According to a first conceivable exemplary embodiment, the rotor body and/or the at least one rotor blade of the at least one rotor can be formed of metal.

The first dielectric can have a plastic or be formed as a plastic. For example, the first dielectric can cover the at least one first rotor blade at least almost completely or even cover it to an extended extent. For example, the first dielectric can be attached to, disposed on, or connected to the at least one first rotor blade. The second dielectric can have a plastic or be formed as a plastic. For example, the second dielectric can cover at least almost completely or even overlap the at least one second rotor blade. For example, the second dielectric can be attached to, disposed on, or connected to the at least one second rotor blade. Alternatively, the second dielectric can have air or be formed as air. For example, the at least one free space can be formed in this manner. Regardless of the exact configuration of the second dielectric, the permittivity of the second dielectric is different from the permittivity of the first dielectric. For example, the permittivity of the first dielectric can be higher than the permittivity of the second dielectric. This can be achieved, for example, by the plastic used for the first dielectric being a plastic with a higher permittivity than the plastic used for the second dielectric. Alternatively, this can be achieved by the plastic used for the first dielectric being a plastic with a higher permittivity than air when air is used as the second dielectric.

The at least one rotor can have a rotor support in each case. The rotor support can be designed to support the main body of the rotor. The rotor support can have a plastic. For example, the rotor support can be formed from a plastic, i.e., formed of a plastic. According to one conceivable exemplary embodiment, the rotor support can have a multi-component plastic part. For example, the rotor support can be formed from a multi-component plastic part, i.e., formed of a multi-component plastic part.

For example, the at least one rotor support formed as a multicomponent plastic part or having a multicomponent plastic part can have multiple sections or sectors each with different plastics. The multiple sections or sectors can form the first dielectric and/or the second dielectric. For example, the multicomponent plastic part can have a two-component plastic part or be formed as a two-component plastic part. The two-component plastic part can have two sections or sectors, each with different plastics. The two sections or sectors can form the first dielectric and/or the second dielectric. Accordingly, the first dielectric can have a plastic or be formed as a plastic. For example, the first dielectric can cover at least almost completely the at least one first rotor blade. For example, the first dielectric can be attached to, disposed on, or connected to the at least one first rotor blade, or it can be part of the at least one first rotor blade or be integrated into the at least one first rotor blade. The second dielectric can have a plastic or be formed as a plastic. For example, the second dielectric can cover at least almost completely the at least one second rotor blade. For example, the second dielectric can be attached to, disposed on, or connected to the at least one second rotor blade, or it can be part of the at least one second rotor blade or be integrated into the at least one second rotor blade. Regardless of the exact configuration of the second dielectric, the permittivity of the second dielectric is different from the permittivity of the first dielectric. For example, the permittivity of the first dielectric can be higher than the permittivity of the second dielectric. This can be achieved, for example, by the plastic used for the first dielectric being a plastic with a higher permittivity than the plastic used for the second dielectric. For example, a section or sector forming the first dielectric can have a plastic or formed of a plastic having a permittivity higher than a plastic which is present in the section or sector or of which the section or sector forming the second dielectric is formed.

For example, the rotor support can have at least one first circular sector-shaped section. The at least one first circular sector-shaped section can have a first radius and form the first dielectric. The rotor support can have at least one second circular sector-shaped section. The at least one second circular sector-shaped section can extend coaxially with the at least one first circular sector-shaped section. The at least one second circular sector-shaped section can have a second radius and form the second dielectric. The second radius can be smaller than the first radius. Due to the smaller second radius, circular sector-shaped recesses or cutouts are formed in the at least one second circular sector-shaped section, which is imagined to be extended in the radial direction.

In other words, the rotor can have a rotor support. The rotor support can have sectors that form the first dielectric. In addition or alternatively, the rotor support can have sectors or recesses that form the second dielectric. The rotor support can be configured such that it has at least one first sector or section and at least one second sector or section. The at least one first sector or section can be circular sector-shaped with a first radius. The at least one second sector or section can be circular sector-shaped with a second radius. The first radius can be larger than the second radius. The at least one first sector or section can be configured such that it aligns with the at least one first rotor blade or covers or overlies the at least one first rotor blade. As a result, the at least one sector or section can lie between the at least one first rotor blade and the stator. In other words, a plastic can thereby lie as the first dielectric between the at least one first rotor blade and the stator. The at least one second sector or section can be configured such that it has at least one recess which is aligned with the at least one second rotor blade. As a result, the at least one recess can be located between the at least one second rotor blade and the stator. In other words, air can thereby lie as the second dielectric between the at least one second rotor blade and the stator. For example, the at least one free space can be formed thereby. Alternatively, the at least one second sector or section can be configured such that it is aligned with the at least one second rotor blade or covers the at least one second rotor blade. As a result, the at least one second sector can lie between the at least one second rotor blade and the stator. In other words, a plastic material can thereby lie as the second dielectric between the at least one second rotor blade and the stator.

There can be a third dielectric having a third permittivity between at least one third of the at least one rotor blade and the at least one stator. Further, additional dielectrics can be provided between the further rotor blades and the stator. In principle, as many different dielectrics can be provided as there are rotor blades and/or free spaces. In other words, the number of different dielectrics can range from two to the number of rotor blades, for example, plus at least one dielectric for any present free spaces.

The rotating element (which may also be referred to as a rotary element) can have a torsion bar or be formed as a torsion bar. The at least one stator and/or the evaluation unit can be arranged on a printed circuit board. The rotating element can extend through the circuit board and the at least one rotor.

According to a further example, a rotation angle sensor is provided. The rotation angle sensor has the position-sensing device as has been/will be described herein. The rotation angle sensor further has a rotation angle detection device. The rotation angle detection device has the at least one stator, the at least one rotor, and the evaluation unit. The evaluation unit is designed to determine an angle of rotation of the at least one rotor relative to the at least one stator based on the reference position.

The position-sensing device according to the first aspect may be combined with a rotation angle detection. For example, a capacitively operating index switch can be combined with an inductively operating rotation angle detection device.

The evaluation unit can be designed to determine the angle of rotation of the at least one rotor based on an inductive coupling between the at least one rotor and the at least one stator. The evaluation unit can determine, for example, as an intermediate result the angle of rotation of the at least one rotor up to a partial or complete revolution. Further, the evaluation unit can be designed to determine the value of the counter described above. The value of the counter can indicate the number of partial or complete revolutions of the at least one rotor blade of the rotor. The evaluation unit can determine the total rotation of the rotor from the intermediate result (for example, the angle of rotation up to 360°) and the value of the counter. The partial angle of rotation can be, e.g., an angle segment. According to one example, exceedances of a respective angle segment, i.e., segment exceedances, can be counted in each case. The angle segment can be, for example, an angle segment of 20° or 40°; i.e., in this case the counter is increased or decreased in each case after reaching or exceeding the angle segment depending on the direction of the exceedance of 20° or 40°. In particular, the angle signal can repeat at every certain intervals, for example, 20° or 40°, and a steering angle of 1440°, for example, can be calculated in this way.

The at least one rotor can be formed as two rotors. The evaluation unit can be designed to determine the angle of rotation of a first of the two rotors and the angle of rotation of a second of the two rotors. The evaluation unit can be designed to determine the total rotation of the first of the two rotors from the determined angle of rotation (up to one complete revolution) and the value of the counter. The evaluation unit can be designed to determine the total rotation of the second of the two rotors from the determined angle of rotation (up to one complete revolution) and the value of the counter. The first rotor can be located at one end of the rotating element. The second rotor can be located at another end of the rotating element. The evaluation unit can be designed to derive the torque acting on the rotating element from the angle of rotation or the total rotation of the first rotor and the angle of rotation or the total rotation of the second rotor. For example, the evaluation unit can be designed to determine a differential angle between the angle of rotation or the total rotation of the first rotor and the angle of rotation or the total rotation of the second rotor. The evaluation unit can derive the torque acting on the rotating element from the differential angle.

Also, a system is proposed. The system has a rotation angle sensor as has been/will be described herein. The system further has a rotating element. The at least one stator of the rotation angle sensor is arranged stationary relative to the rotating element. The at least one rotor is connected non-rotatably to the rotating element. The evaluation unit of the rotation angle sensor is designed to determine a torque acting on the rotating element from the determined rotation angle or the total rotation of the at least one rotor. The rotating element can have a torsion bar or be formed as a torsion bar.

The evaluation unit can be designed to determine a torque acting on the rotating element from the determined angle of rotation or the total rotation of the at least one rotor. For example, the evaluation unit can be designed to derive the torque acting on the rotating element from the determined angle of rotation or the total rotation of the at least one rotor.

The described rotation angle sensor and the described system can be implemented entirely or in part using a computer program. Thus, a computer program product can be provided with program code sections for executing the method. The computer program can be stored on a computer-readable storage medium or in the rotation angle sensor and/or the system, for example, in the evaluation unit. When the program code sections of the computer program are loaded into a computer or processor (for example, a microprocessor, microcontroller, or digital signal processor (DSP), or digital hardwired logic in an ASIC) or run on a computer or processor, they can cause the computer or processor to perform one or more steps or all steps of the technique described herein.

Even if some of the aspects and details described above have been described with respect to the rotation angle sensor, thus, these aspects can also be implemented in a corresponding manner in the system using the rotation angle sensor or a computer program supporting the rotation angle sensor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3b shows a further view of the rotor according to the example FIG. 3a; and

DETAILED DESCRIPTION

Specific details are set forth below, without being limited hereto, in order to provide a complete understanding of the present invention. However, it will be clear to a skilled artisan that the present invention may be used in other exemplary embodiments which may depart from the details set forth below.

It is also clear to the skilled artisan that the explanations set forth below are/can be implemented using hardware circuits, software, or a combination thereof. The software can be associated with programmed microprocessors or a general purpose computer, ASIC (application-specific integrated circuit), and/or DSPs (digital signal processors). It is further clear that even if the following details are described with respect to a method, these details can also be realized in a suitable device unit, computer processor, or memory connected to a processor, wherein the memory is provided with one or more programs that perform the method when they are executed by the processor.

Figure 1:
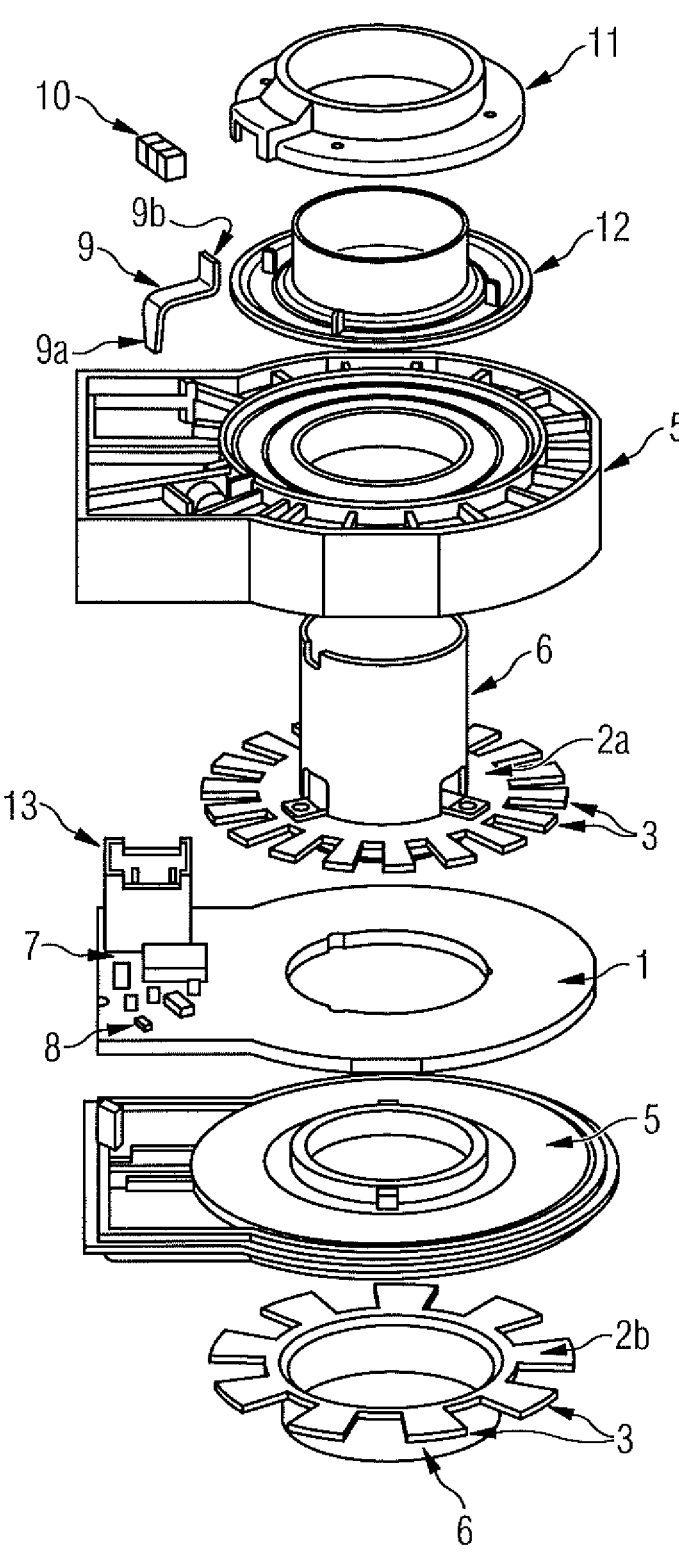
FIG. 1 shows an exploded view of a conventional inductive torque sensor.

FIG. 1 shows an inductive torque sensor known from the conventional art. The inductive torque sensor comprises a printed circuit board 1 and two rotor discs 2 (or two rotors 2 for short), wherein rotor discs 2 have different rotor structures 3 with structure sizes of, for example, 20° and 40°. Rotor discs 2 are arranged largely parallel and on a common shaft, which is formed here by a torsion bar. This is part of a steering shaft here. Rotor discs 2 are distributed with a short distance to both main surfaces of circuit board 1. Circuit board 1 and a first of rotor discs 2a are substantially closely surrounded by a housing 5. A second of rotor discs 2b is mounted on the outside of housing 5 with a minimal clearance. Rotor discs 2, circuit board 1, and housing 5 each have an opening for the torsion bar. The openings are aligned accordingly.

Each rotor disk 2 is fastened non-rotatably to the torsion bar by means of a support structure 6, wherein the latter has a torsion element between rotor discs 2. The one-piece support structure 6 comprises a tubular part whose inner diameter corresponds to the diameter of an associated part of the torsion bar plus a predefined small clearance and to which the corresponding rotor disc 2a, 2b is attached. On support structure 6 of first rotor disc 2a, which is arranged in housing 5, a disc 12 is attached from the outside, which here lies closely against housing 5. In this way, the torque sensor is inherently stabilized against tilting, which minimizes related measurement errors.

Four stators are formed on circuit board 1, which form four angle sensors in conjunction with the two rotors 2. The stators, together with required excitation structures, are applied and contacted in a known manner as conductive traces on the two main surfaces of circuit board 1. The structures of the stators are matched to the structures of rotor discs 2a, 2b.

Furthermore, at least one application-specific integrated circuit (ASIC) 7 is arranged on circuit board 1. Each circuit 7 has at least two channels. If necessary, at least one evaluation unit is connected downstream of circuit 7. Circuit 7 and, if applicable, the at least one evaluation unit form the means for evaluation.

For electrical connection to, e.g., a control unit and, if necessary, to the evaluation unit, a socket 13 with corresponding contact pins is attached to the printed circuit board.

In operation, rotors 2 are rotated relative to the stators by means of the torsion bar. As a result, corresponding signals are fed into the channels of circuit 7 and, starting from a specified zero position, are calculated into angles of rotation. Depending on a torque applied to the steering rod via a steering wheel, the torsion bar twists by a certain angle so that the two rotors 2 are rotated by correspondingly different angles of rotation. A differential angle, from which the torque exerted on the steering rod is determined, is calculated from these different angles of rotation.

Furthermore, a Hall sensor 8, a permanent magnet 10, and a flux guide plate 9 can be used to determine a number of complete revolutions of the torsion bar: As soon as the torsion bar is rotated axially and permanent magnet 10 passes through the reference position, the magnetic flux is conducted through flux guide plate 9 to Hall sensor 8, which then emits a switching signal that is counted. Depending on the direction of rotation of the torsion bar, the number 1 is added or subtracted for each switching signal; an actual steering angle position can be determined from the sum in connection with the signal of the angles of rotation.

Figure 2:
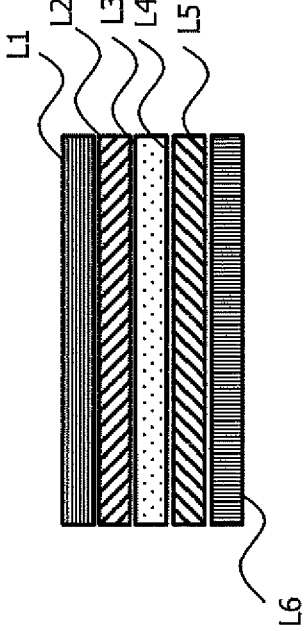
FIG. 2 shows a schematic diagram of multilayer circuit board.

Each of the angle detectors has a stator in addition to the rotor, for example, rotor 2. In inductive sensors, the stator is constructed in a manner known to the skilled artisan and has at least one excitation coil and at least one sensor coil. In the present exemplary embodiment, the particular stator is arranged on a single multilayer circuit board 1, which is shown by way of example in FIG. 2. The multilayer circuit board 1 has a total of six layers, which are labeled L1, L2, L3, L4, L5, and L6 in FIG. 2. The individual layers L1 to L6 are applied to the circuit board material, which for the purpose of better clarity is symbolized in FIG. 2 by means of different textures. The stator of the angle detector partially shown in FIG. 1 is arranged on layers L1 and L2 of circuit board 1, and the stator of the angle detector is arranged on layers L5 and L6 of circuit board 1. On the one hand, the indexer designed as an inductive sensor is arranged on layers L3 and L4 of circuit board 1. On the other hand, layers L3 and L4 of circuit board 1 are additionally designed as shielding, by means of which an undesired interaction between the angle detector which are designed as inductive sensors is at least reduced, the stators of which are arranged on layers L1 and L2 as well as on layers L5 and L6 of circuit board 1. In FIG. 2, only layers L1 to L6 are shown, but not the stators and the indexer designed as an inductive sensor.

Today's torque sensors are basically based on the principles described with reference to FIGS. 1 and 2 or on the principles with magnetic shutters also outlined above. A component of a modern power steering system is a so-called torsion bar, which twists when torque is applied. The two ends of the torsion bar are often referred to as the "input shaft" and "output shaft" (or herein, also as the input side and output side). In today's technologies, which are sometimes also referred to as CIPOS structures, a multilayer printed circuit board (PCB), as it was described with reference to FIG. 2, for example, contains multiple measurement channels. In particular, layers L1, L2 realize measurement channels measuring the angle of the "input shaft"; layers L3, L4 are shielding layers and layers L5, L6 include measurement channels for measuring the angle at the "output shaft." The difference of the angles at the "input shaft" and "output shaft" reflects the twist of the torsion bar and is proportional to the torque that the driver applies to the steering wheel for steering.

In particular, CIPOS sensors are designed so that an eighteen-bladed CIPOS sensor (IS) with an eighteen-bladed rotor (IS-R) with an unambiguous range of 360°/18=20° is formed on the "input shaft" side (input side) and a nine-bladed rotor (OS-R) with an absolute measuring range of 40° is formed on the "output shaft" side (output side). The rotors with the nine (or eighteen) blades are formed, among other things, by metallic stamped/bent parts or they are plastic parts that contain electrically conductive surfaces or they are overmolded stamped parts.

The details described with reference to FIGS. 1 and 2 describe an inductively operating rotation angle sensor. With such a rotation angle sensor, it is laborious to distinguish a specific angle of rotation from an angle of rotation rotated by one full revolution. Therefore, using indexing as soon as a full revolution was reached was considered.

For this purpose, modifying the surfaces of the rotors using cutouts in order to make them distinguishable was considered. Full-surface rotor blades and hollow blades become distinguishable due to the surfaces of the rotors modified by the cutouts. Thus, for example, a modified blade can be distinguished from the other blades and indexing can occur once the modified blade has moved one full revolution. That is, the rotor of an angle detector for detecting an angular position of the rotating part relative to a reference position additionally serves to index at a predetermined rotation, preferably a 360° rotation, of the rotating part relative to the reference position by means of the indexer.

The inductive sensor (CIPOS) described in regard to FIGS. 1 and 2 primarily uses the outer contour of a blade and not the surface itself. For the inductive sensing of the position (CIPOS), full surfaces in principle always tend to be negative, because eddy currents can develop freely. The design with hollow and full blades therefore represents an inductive asymmetry, albeit small, which is disadvantageous for the measurement. New implementations are therefore desirable.

Figure 3A:
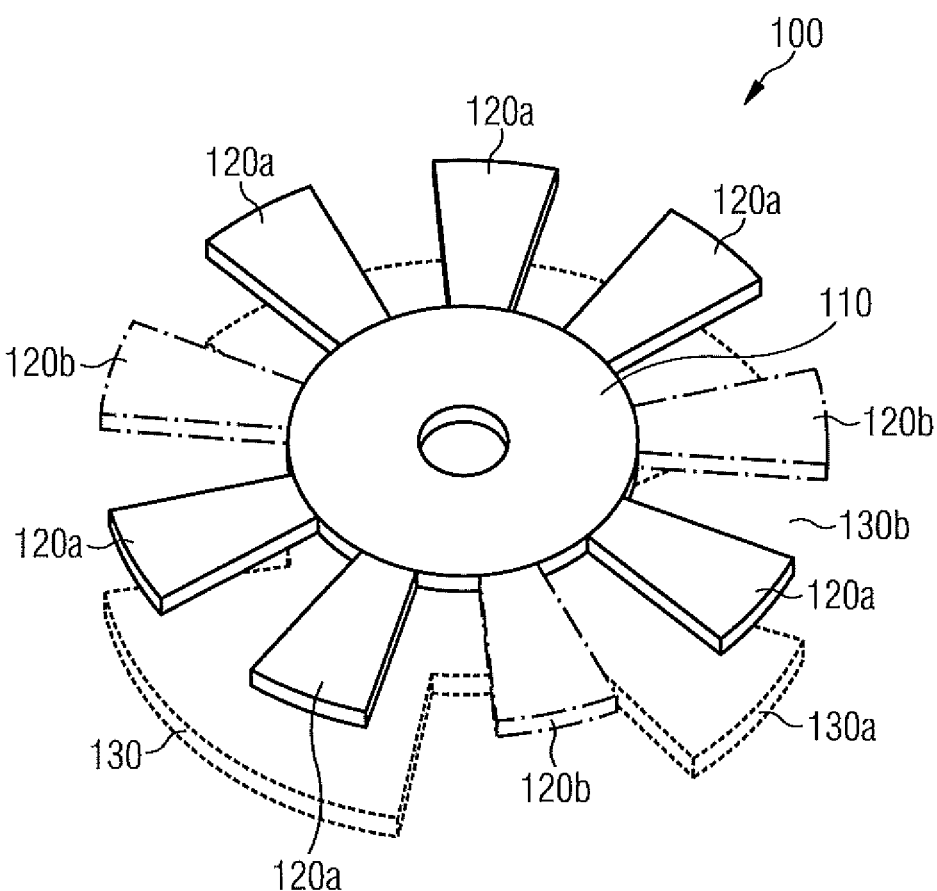
FIG. 3a shows a view of a rotor according to an example.
Figure 3B:
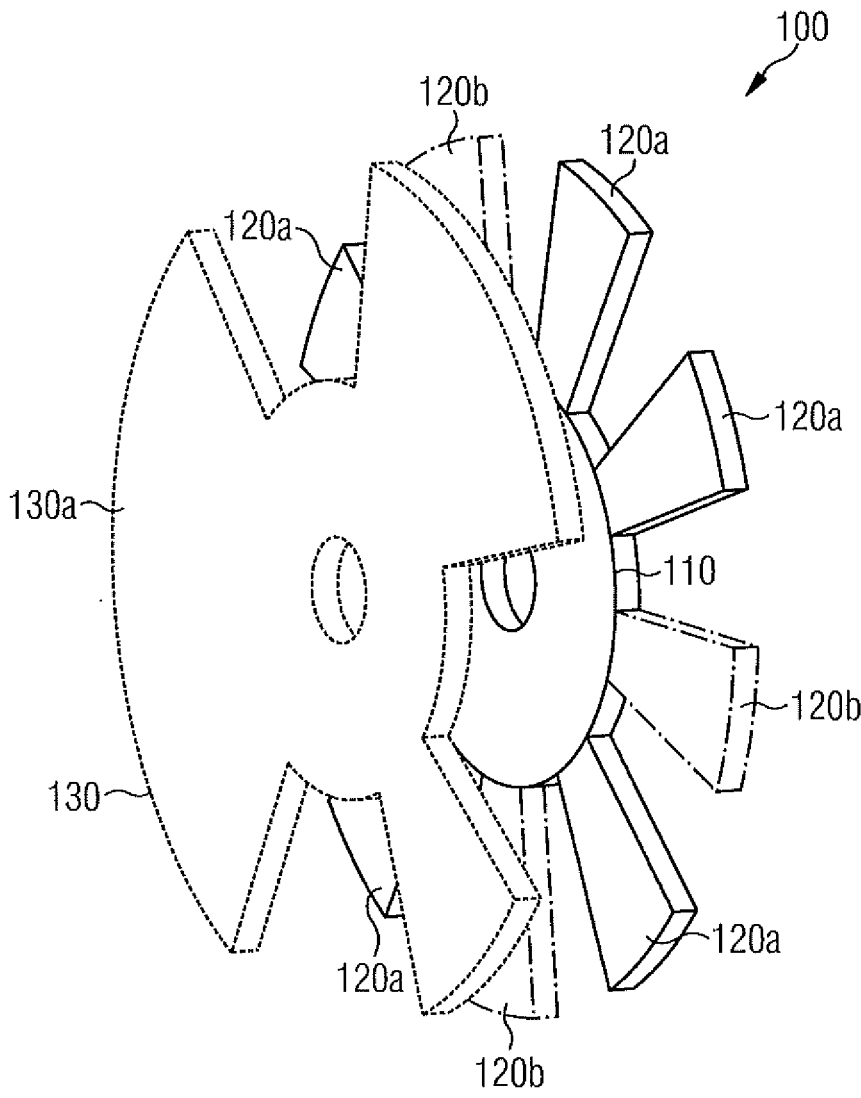
Figure 3C:
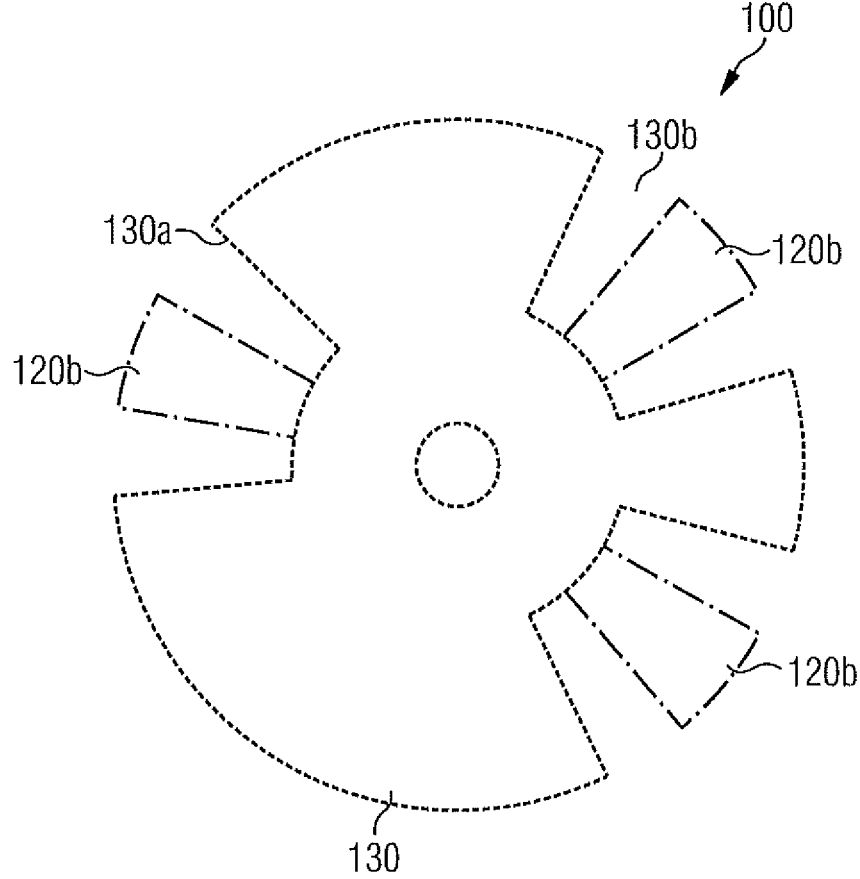
FIG. 3c shows a further view of the rotor according to the example from FIGS. 3a and 3b.

FIGS. 3a to 3c show a rotor of a capacitively operating position-sensing device and/or a rotation angle sensor with such a capacitively operating position-sensing device. The basic design of the rotation angle sensor can correspond to the basic design of the inductive sensor shown in FIG. 1. However, alternative embodiments are also possible, for example, torque sensors with magnetic shutters. In the following, a structure of the rotor of a capacitively operating position-sensing device and/or a rotation angle sensor with such a position-sensing device is described with reference to FIGS. 3a to 3c.

The capacitively operating position-sensing device has at least one stator, at least one rotor 100, and an evaluation unit. The at least one stator can be arranged stationary relative to a rotating element. This means that when the rotating element rotates, the stator does not rotate with it when it is connected to the rotating element. The at least one rotor 100 can be connected non-rotatably to the rotating element. This means that when the rotating element rotates, rotor 100 rotates with it when it is connected non-rotatably to the rotating element. The at least one rotor 100 has a main body 110 and, by way of example, a plurality of rotor blades 120a, 120b extending radially outward from main body 110 (as an example for at least one rotor blade). There is a first dielectric having a first permittivity between at least one first rotor blade 120a of the multiple rotor blades and the at least one stator. There is a second dielectric having a second permittivity between at least one second rotor blade 120b of the plurality of rotor blades and the at least one stator. The first permittivity and the second permittivity are different from each other. The evaluation unit is designed to sense if the at least one first rotor blade 120 reaches, has reached, or exceeds a predefined rotational position.

A torsion bar is assumed to be the rotating element in the following.

Rotor 100 of FIGS. 3a to 3c has a rotor support 130 by way of example. Rotor support 130 is designed to support main body 110 and thus rotor blades 120a, 120b and is connected non-rotatably to main body 110 and to rotor blades 120a, 120b. Rotor support 130 can have a metal or be made of a metal. In addition or alternatively, rotor support 130 can have a plastic or be made of a plastic. In the example in FIGS. 3a to 3c, by way of example, rotor support 130 is made of a plastic. Main body 110 can have a metal or be made of a metal. In addition or alternatively, main body 110 can have a plastic or be made of a plastic. In the example in FIGS. 3a to 3c, by way of example, main body 110 formed of a metal. Rotor blades 120a, 120b can have a metal or be made of a metal. In addition or alternatively, rotor blades 120a, 120b can have a plastic or be made of a plastic. In the example in FIGS. 3a to 3c, by way of example, rotor blades 120a, 120b formed of a metal.

In the example in FIGS. 3a to 3c, rotor 100 has nine rotor blades 120a, 120b. A different number of rotor blades is conceivable and possible, for example, eighteen rotor blades for the input shaft (for the input side). Of the nine rotor blades, six are formed by way of example as first rotor blades 120a. Of the nine rotor blades, three are formed by way of example as second rotor blades 120b.

The first dielectric can have a plastic or be formed as a plastic. The second dielectric can have a plastic or be formed as a plastic and/or can have air or be formed as air. In the example in FIGS. 3a to 3c, by way of example, the first dielectric is formed of a plastic and, by way of example, the second dielectric is formed of air.

In the example in FIGS. 3a to 3c, the first dielectric is formed by rotor support 130. More specifically, rotor support 130 is configured such that it has first sectors or sections 130a and second sectors or sections 130b. The first sectors or sections 130a are circular sector-shaped with a first radius. The second sectors or sections 130b are circular sector-shaped with a second radius. The first radius is larger than the second radius. The first sectors or sections 130a are configured such that they are in alignment with the first rotor blades 120a or cover the first rotor blades 120a. As a result, sectors 130a are located between the first rotor blades 120a and the stator. In other words, a plastic as a first dielectric lies between the first rotor blades 120a and the stator. Due to their smaller radius, the second sectors or sections 130b are formed such that recesses form that are in alignment with rotor blades 120b. As a result, the recesses are located between the second rotor blades 120b and the stator. In other words, air is thereby located as a second dielectric between the second rotor blades 120b and the stator. In the example in FIGS. 3a to 3c, the permittivity of the first dielectric is greater than the permittivity of air.

Rotor 100 can further have at least one third rotor blade, wherein there is a third dielectric having a third permittivity between the at least one third rotor blade and the at least one stator.

The evaluation unit can be designed to sense if at least one of the six first rotor blades 120a reaches, has reached, or exceeds a predefined rotational position. When the predefined rotational position is reached or exceeded, the evaluation unit can increment a counter (e.g., by the value 1). For example, the evaluation unit can then generate a switching signal each time the at least one of the six first rotor blades 120a reaches, has reached, or exceeds the predefined rotational position. The switching signal can indicate to increase the switch. The predefined rotational position can correspond to a rotation angle segment, for example. The rotation angle segment can cover an angle of 20° or 40°, for example.

According to an example, only a single first rotor blade 120a can be provided. In this case, the evaluation unit can be configured to sense when the single first rotor blade 120a reaches, has reached, or exceeds the predefined rotational position, e.g., 360°. When the single first rotor blade 120a reaches, has reached, or exceeds the predefined angle of rotation, the evaluation unit can output a switching signal to switch the counter. As a result, predefined rotation angles, such as partial or complete revolutions, to be counted/indexed. In this way, for example, the indexer described with reference to FIG. 2 (which can also be referred to as an indexing component or indexing device) can be implemented as a capacitively operating sensor.

The at least one rotor can be designed as two rotors. A first of the two rotors can be located at the input shaft (the input side) and a second of the two rotors can be located at the output shaft (the output side). The evaluation unit can determine the angle of rotation or the total rotation of the two rotors and form the difference from both angles of rotation or both total rotations to determine a differential angle. The evaluation unit can determine a torque acting on the torsion bar from the differential angle.

The example described with reference to FIGS. 3a to 3c serves, so to speak, to realize a capacitively operating switch. The capacitively operating switch can be combined with the inductively operating angle of rotation detection as described with reference to FIG. 1. For example, the evaluation unit can determine the angle of rotation of the rotor (up to a complete rotation of 360°) with consideration of inductive coupling. With additional consideration of the value of the counter, the overall completed rotation of the rotor with values of more than 360° can be determined efficiently. A capacitively operating switch is combined as it were with an inductive rotation angle detection. In this way, an inductively operating rotation angle detection can be combined in the best possible way with a capacitively operating switch at a predefined rotational position (for example, at 40° or 360°). This means that it is possible to use the switch with metallic conductively designed blades as an inductive position sensor (CIPOS).

According to one example, the largest unambiguous range is on the side of the nine rotor blades and is therefore 360°/9=40°. In this case, the index switch also detects straight travel with a plausibility check. According to this, the counter counts as soon as a predefined rotational position, for example, an angle segment of 40°, is reached or exceeded (i.e., the overlaps of the 40° track are counted). The steering angle is therefore the steering angle=n*40°+ measured angle of the rotation angle sensor (e.g., CIPOS) within the 40° segment.

In other words, according to this example, it is detected when an angle segment (of, e.g., 40°) is reached or exceeded. As soon as the angle segment is reached or exceeded, the counter is increased or decreased depending on the direction of the exceedance. This counter works capacitively. For example, if five angle segments have been reached or exceeded, the counter can be used to determine an approximate angle of rotation of 5*40°=200. The exact steering angle can be determined using the inductively operating rotational angle detection device. If, for example, an angle of 12° is determined with the rotational angle determination device, this results in a steering angle of 5*40°±12°=212°.

This means that a capacitive modulation for a capacitive sensor or switch operating, for example, in parallel with the inductive sensor is achieved by designing the rotor so that between the rotor and stator of the angle sensor or angle switch a coding of the dielectric is made by means of several different dielectrics. Thus, individual rotor blades to be emphasized can be backed with a plastic of the highest possible dielectric value/dielectric constant (permittivity), while other blades that are not to be coded are not backed with plastic and here only the permittivity of air acts electrically. The plastic body designed in this way also serves as a support for the metallic rotor structure.

Alternatively, a rotor can be realized from a two-component plastic part, in which individual sectors of the rotor are realized with plastics of different permittivities. In addition to two-component plastic parts, plastic parts, for example, injection molded parts, with 3 to n different plastics are conceivable in principle.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A position-sensing device for a rotation angle sensor, the position-sensing device comprising:
   at least one stator;
   at least one rotor having a main body, the at least one rotor being rotatable;
   a first dielectric having a first permittivity between at least one first rotor blade that extends radially outward from the main body and the at least one stator;
   a second dielectric having a second permittivity between at least one second rotor blade that extends radially outward from the main body and the at least one stator or between at least one free space adjoining the at least one first rotor blade in the circumferential direction of the rotor and the at least one stator, the first permittivity and the second permittivity being different from each other; and
   an evaluation unit to sense when the at least one first rotor blade reaches, has reached, or exceeds a predefined rotational position.

2. The position-sensing device according to claim 1, wherein the evaluation unit senses, based on a capacitive coupling between the at least one rotor and the at least one stator, when the at least one first rotor blade reaches, has reached, or exceeds a predefined rotational position, based on a reference position.

3. The position-sensing device according to claim 1, wherein the evaluation unit generates a switching signal when the at least one first rotor blade reaches, has reached, or exceeds the predefined rotational position.

4. The position-sensing device according to claim 1, wherein the first dielectric has a plastic or is formed as a plastic.

5. The position-sensing device according to claim 1, wherein the second dielectric has a plastic or is formed as a plastic or wherein the second dielectric has air or is formed as air.

6. The position-sensing device according to claim 1, wherein the at least one rotor has a rotor support designed to support the main body of the at least one rotor.

7. The position-sensing device according to claim 6, wherein the rotor support has a plastic or is formed from a plastic or a multi-component plastic part.

8. The position-sensing device according to claim 6, wherein the rotor support has at least one first circular sector-shaped section, and wherein the at least one first circular sector-shaped section has a first radius and forms the first dielectric.

9. The position-sensing device according to claim 8, wherein the rotor support has at least one second circular sector-shaped section, wherein the at least one second circular sector-shaped section has a second radius and forms the second dielectric, and wherein the second radius is smaller than the first radius.

10. The position-sensing device according to claim 1, wherein there is a third dielectric having a third permittivity between at least one third rotor blade of the at least one rotor blade and the at least one stator.

11. A rotation angle sensor comprising:

the position-sensing device according to claim 1; and a rotation angle detection device comprising:

at least one stator;

at least one rotor; and an evaluation unit, wherein the evaluation unit determines an angle of rotation of the at least one rotor relative to the at least one stator based on the reference position.

12. The rotation angle sensor according to claim 11, wherein the evaluation unit determines the angle of rotation of the at least one rotor based on an inductive coupling between the at least one rotor and the at least one stator.

13. A system comprising the rotation angle sensor according to claim 11 and a rotating element, wherein the at least one stator of the rotation angle sensor is arranged stationary relative to the rotating element and the at least one rotor and is connected nonrotatably to the rotating element, and wherein the evaluation unit of the rotation angle sensor is designed to determine a torque acting on the rotating element from the determined angle of rotation of the at least one rotor.

14. A position-sensing device for a rotation angle sensor, the position-sensing device comprising:

at least one stator;

at least one rotor having a main body with first rotor blades and second rotor blades that each extend radially outward from the main body;

a first dielectric having a first permittivity between the first rotor blades and the at least one stator;

a second dielectric having a second permittivity between the second rotor blades and the at least one stator, the first permittivity and the second permittivity being different from each other;

an evaluation unit to sense when the first rotor blades reach, have reached, or exceed a predefined rotational position; and a rotor support to support the main body, the rotor support being positioned between the at least one rotor and the at least one stator, the rotor support having first sections that extend radially outward and align with the first rotor blades, wherein each of the first sections of the rotor support are spaced apart from one another, such that in a circumferential direction around the rotor support, spaces are provided between the first sections, wherein the second rotor blades are aligned with the spaces of the rotor support, and wherein the first sections of the rotor support form the first dielectric between the first rotor blades and the at least one stator and the spaces of the rotor support form the second dielectric between the second rotor blades and the at least one stator.

* * * * *